(12) United States Patent
Lee et al.

(10) Patent No.: US 11,027,519 B2
(45) Date of Patent: Jun. 8, 2021

(54) SELF-STRESSING ENGINEERED COMPOSITE MATERIALS, METHODS OF SELF-STRESSING ENGINEERED COMPOSITE MATERIALS, AND SELF-STRESSING REINFORCEMENT FOR SAME

(71) Applicant: The University of Vermont and State Agricultural College, Burlington, VT (US)

(72) Inventors: Patrick Chang Dong Lee, South Burlington, VT (US); Dryver R. Huston, South Burlington, VT (US); Ting Tan, Shelburne, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 15/569,655

(22) PCT Filed: Apr. 29, 2016

(86) PCT No.: PCT/US2016/030207
§ 371 (c)(1),
(2) Date: Oct. 26, 2017

(87) PCT Pub. No.: WO2016/176623
PCT Pub. Date: Nov. 3, 2016

(65) Prior Publication Data
US 2018/0111348 A1 Apr. 26, 2018

Related U.S. Application Data

(60) Provisional application No. 62/154,544, filed on Apr. 29, 2015.

(51) Int. Cl.
*B32B 5/10* (2006.01)
*B32B 5/02* (2006.01)
(Continued)

(52) U.S. Cl.
CPC ............... *B32B 5/10* (2013.01); *B32B 5/024* (2013.01); *B32B 5/26* (2013.01); *B32B 7/08* (2013.01);
(Continued)

(58) Field of Classification Search
None
See application file for complete search history.

(56) References Cited

U.S. PATENT DOCUMENTS 3,466,822 A 4/1967 Hull et al.
5,552,197 A * 9/1996 Bettinger ............... B29C 70/56
428/34.9
(Continued)

FOREIGN PATENT DOCUMENTS

AU 3374378 A 9/1979
AU 2012258377 B2 4/2015
(Continued)

OTHER PUBLICATIONS

International Search Report and Written Opinion dated Aug. 4, 2016, in connection with PCT/US16/30207.
(Continued)

*Primary Examiner* — Shawn Mckinnon
(74) *Attorney, Agent, or Firm* — Downs Rachlin Martin PLLC

(57) ABSTRACT

Self-stressing engineered composites that include a matrix containing self-stressing reinforcement that is activated by an activator that causes, in situ, the self-stressing reinforcement to transfer at least some of its pre-stress into portions of the matrix adjacent the self-stressing reinforcement. In
(Continued)

some embodiments, the activator can be of a self-activating, an internal activating, and/or an external activating type. In some embodiments, the self-stressing reinforcement includes an active component that holds and transfers pre-stress to a matrix and a releasing component that causes the active component to transfer its pre-stress to the matrix. In some embodiments, the self-stressing reinforcement is initially unstressed and becomes stressed upon activation. Various engineered composites, self-stressing reinforcement, and applications of self-stressing engineered composites are disclosed.

21 Claims, 6 Drawing Sheets

(51) Int. Cl.
| | | |
|---|---|---|
| B32B 5/26 | (2006.01) | |
| B32B 13/02 | (2006.01) | |
| B32B 13/04 | (2006.01) | |
| B32B 13/14 | (2006.01) | |
| B32B 27/20 | (2006.01) | |
| B32B 13/12 | (2006.01) | |
| C04B 28/02 | (2006.01) | |
| C04B 16/06 | (2006.01) | |
| C04B 20/10 | (2006.01) | |
| E04C 5/08 | (2006.01) | |
| E04G 23/02 | (2006.01) | |
| B32B 7/08 | (2019.01) | |
| C04B 111/00 | (2006.01) | |

(52) U.S. Cl.
CPC .............. *B32B 13/02* (2013.01); *B32B 13/04* (2013.01); *B32B 13/12* (2013.01); *B32B 13/14* (2013.01); *B32B 27/20* (2013.01); *C04B 16/06* (2013.01); *C04B 20/10* (2013.01); *C04B 20/1048* (2013.01); *C04B 28/02* (2013.01); *E04C 5/08* (2013.01); *E04C 5/085* (2013.01); *E04G 23/0218* (2013.01); *B32B 2260/021* (2013.01); *B32B 2260/046* (2013.01); *B32B 2262/02* (2013.01); *B32B 2262/103* (2013.01); *B32B 2262/12* (2013.01); *B32B 2307/54* (2013.01); *B32B 2307/542* (2013.01); *B32B 2419/00* (2013.01); *B32B 2556/00* (2013.01); *B32B 2607/00* (2013.01); *C04B 2111/00612* (2013.01); *E04G 2023/0255* (2013.01)

(56) References Cited

U.S. PATENT DOCUMENTS

| | | | |
|---|---|---|---|
| 5,803,963 A | * | 9/1998 | Dry .................... A61L 27/48 106/677 |
| 6,174,595 B1 | | 1/2001 | Sanders |
| 2006/0119011 A1 | | 6/2006 | Blackmore |
| 2008/0072799 A1 | | 3/2008 | Jau |
| 2009/0239977 A1 | | 9/2009 | Dubey et al. |
| 2011/0239905 A1 | | 10/2011 | De Smet et al. |
| 2014/0221303 A1 | | 8/2014 | Engqvist et al. |

FOREIGN PATENT DOCUMENTS

| | | |
|---|---|---|
| JP | 2006009361 A | 1/2006 |
| WO | 2014021056 A1 | 2/2014 |

OTHER PUBLICATIONS

Supplementary European Search Report dated Nov. 13, 2018, in connection with EP 16787260.

* cited by examiner

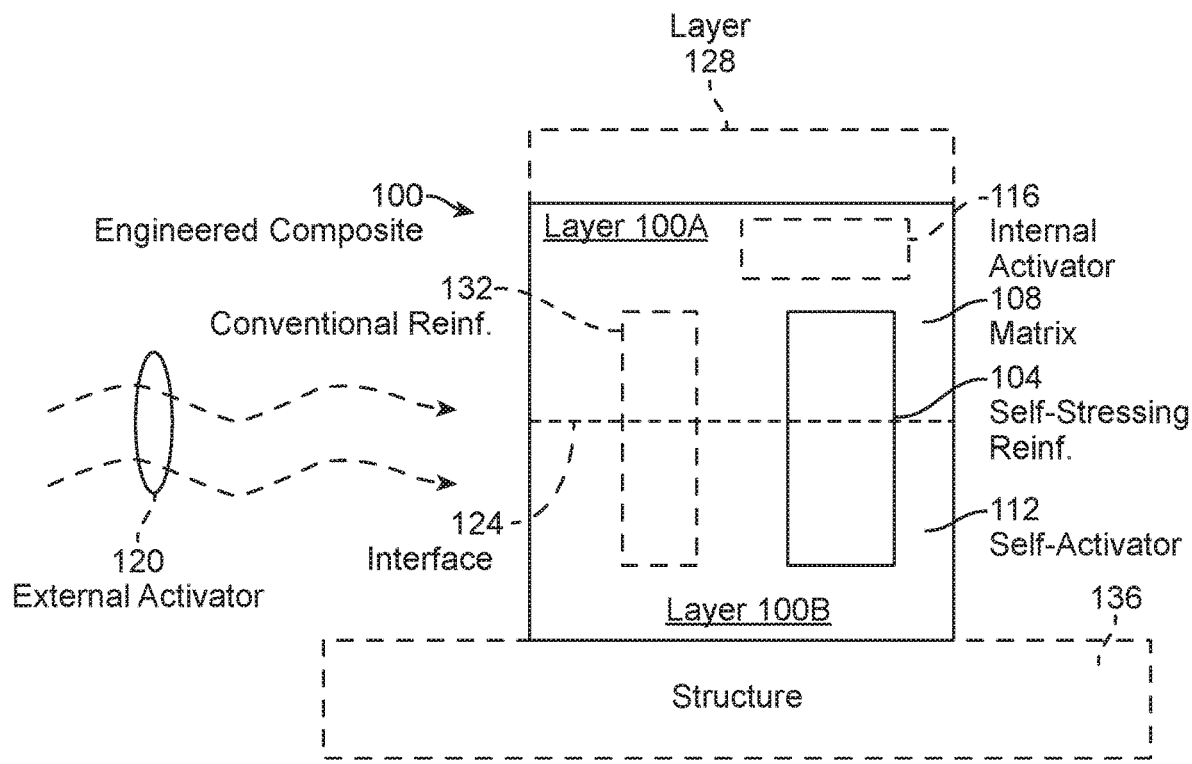
FIG. 1
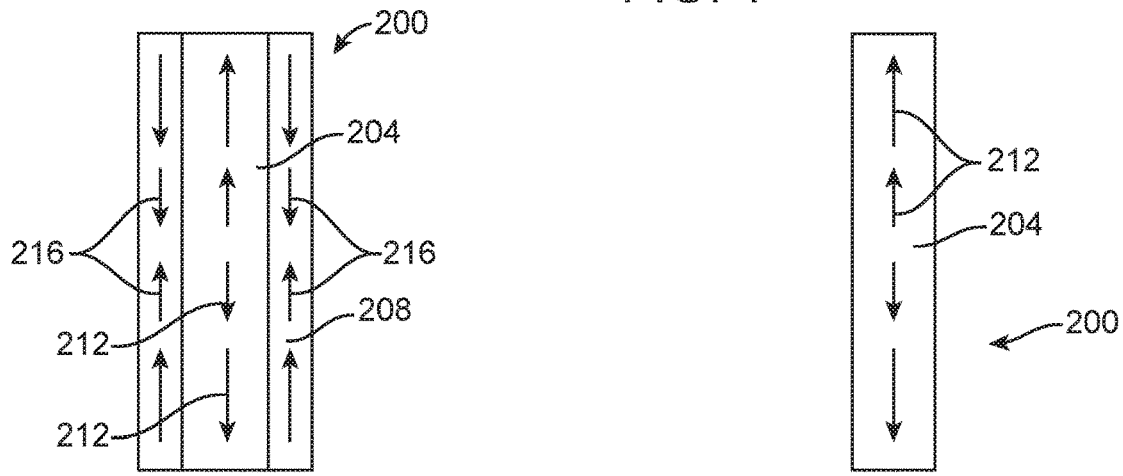
FIG. 2A
FIG. 2B
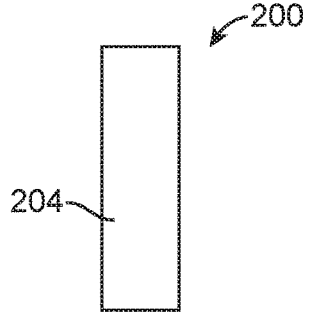
FIG. 2C

SELF-STRESSING ENGINEERED COMPOSITE MATERIALS, METHODS OF SELF-STRESSING ENGINEERED COMPOSITE MATERIALS, AND SELF-STRESSING REINFORCEMENT FOR SAME

RELATED APPLICATION DATA

This application claims the benefit of priority of U.S. Provisional Patent Application Ser. No. 62/154,544, filed on Apr. 29, 2015, and titled "In-Situ Pre-Compressing Reinforcement For An Engineered Composite And Methods Of Pre-Compressing An Engineered Composite," which is incorporated herein by reference in its entirety.

FIELD OF THE INVENTION

The present invention generally relates to the field of engineered composite materials. In particular, the present invention is directed to self-stressing engineered composite materials, methods of self-stressing engineered composite materials, and self-stressing reinforcement for same.

BACKGROUND

Engineered composite materials, or simply "engineered composites," such as Portland cement concrete, asphalt concrete, and fiber-reinforced plastics are used extensively in the construction and other industries. For example, reinforced concrete is one of the most commonly used structural materials in the construction industry, primarily due to its cost, durability, and ability to be easily fabricated into a variety of shapes, both on and off site. Reinforced concrete is a composite material typically composed of stone and sand aggregates, cement binder, and steel reinforcement. Unreinforced concrete is strong in compression but weak in tension, which would cause it to crack even under moderate loads. Placing steel reinforcing bars in key locations in concrete members produces a strong composite structural member that carries both tensile and compressive loads. The typical reinforced concrete assembly places the steel in the concrete with no pre-stress. Tensile loads of sufficient magnitude crack the concrete and the tension transfers to the steel. Pre-stressing or post-tensioning steel reinforcement creates a higher performance composite that tends to not crack in tension, thereby increasing the versatility of applications, such as multi-level parking structures where surface cracks can lead to water and road salt infiltration that causes the steel reinforcement to severely corrode, ultimately leading to the need to remediate or replace the structures.

Conventional fiber reinforcement is often used to control cracking, particularly in concrete slabs and is sometimes used to strengthen steel-reinforced concrete. The fibers are either polymer or steel. The locations and orientations of the fibers in the concrete is random due to the fibers being mixed into the concrete during mixing operations. This creates a composite that is capable of withstanding a variety of compression, tension and distortional loads—often in ways that are not possible with typical steel-bar type reinforcement. Fiber reinforcement is a relatively new technology, and its applications and uses are growing.

SUMMARY

In one implementation, the present disclosure is directed to an engineered composite that includes a matrix and self-stressing reinforcement contained in the matrix, wherein the self-stressing reinforcement imparts compressive stress into adjacent portions of the matrix in response to activation by an activator during forming of the engineered composite.

In another implementation, the present disclosure is directed to self-stressing reinforcement for an engineered composite that includes a matrix having a cure time for achieving a cured state from an uncured state. The self-stressing reinforcement includes a body designed and configured so that, when the body is present in the matrix, stress transfers between portions of the body and the matrix in the cured state, the body composed of at least one material responsive to an activator present during the cure time so as to cause a change in the body that results in tensile stress in the body inducing compressive stress into the matrix so as to cause the matrix to be pre-stressed in the cured state.

In yet another implementation, the present disclosure is directed to an engineered composite that includes first and second layers forming an interface with one another; and self-stressing reinforcement contained in the first and second layers and extending across the interface, wherein, at a delaminated region between the first and second layers at the interface, the self-stressing reinforcement is activated in response to formation of the delaminated region, the activation causing the self-stressing reinforcement to impart compressive stress into adjacent portions of the first and second layers so as to counteract effects of the delaminated region.

In still another implementation, the present disclosure is directed to a method of rejuvenating a structural component. The method includes applying a patch to the structural component, the patch comprising a matrix and self-stressing reinforcement; and activating the self-stressing reinforcement to impart tensile strain within the patch so as to cause the patch to impart at least part of the tensile strain into the structural component as compressive strain.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a block diagram illustrating a self-stressing engineered composite made in accordance with aspects of the present invention;

FIGS. 2A to 2C are cross-sectional views, to scale relative to one another, of a segment of symmetrically pre-tensioned reinforcement of the present invention, respectively, before tension release, before deformation from release of the internal tension, and after tension release;

DETAILED DESCRIPTION

Figure 3:
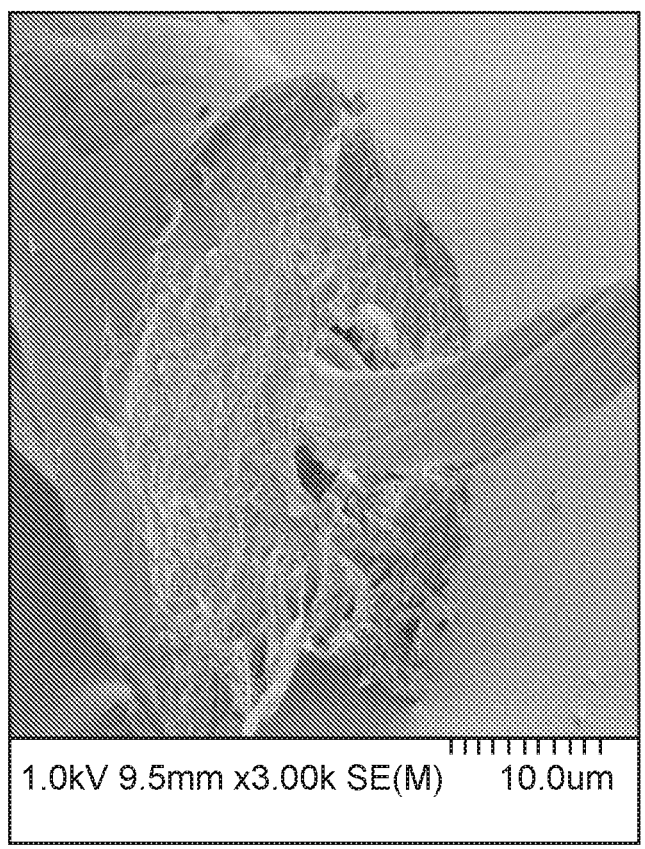
FIG. 3 is a scanning electron microscope image of a coaxial fiber having the configuration illustrated in FIG. 2A.

In some aspects, the present invention is directed to "self-stressing" engineered composites containing self-stressing reinforcement that changes, in situ within the engineered composites, its state of internal stress to impart stress into other parts of the engineered composites. Referring now to the drawings, FIG. 1 depicts an exemplary engineered composite 100 made in accordance with the present invention. Engineered composite 100 may compose or be part of any of a vast array of structures, such as, but not limited to, beams, girders, joists, slabs, columns, hangers, bracing, brackets, plates, panels, sheets, patches, molded objects, machined objects, parts of an assembly, etc. Fundamentally, there is no limitation on the structure(s) of which engineered composite 100 may compose or be part.

In a basic form, engineered composite 100 includes self-stressing reinforcement 104 contained within a matrix 108. As used herein and in the appended claims, the term "self-stressing" in connection with an engineered composite, such as engineered composite 100 of FIG. 1, indicates that stress is induced into material encasing the specially designed reinforcement (such material referred to herein and the appended claims as the "matrix" of the engineered composite) by strain within the reinforcement itself due to the reinforcement's response to an activator. When used to modify "reinforcement," such as in the case of self-stressing reinforcement 104 of FIG. 1, the term "self-stressing" refers to specially designed reinforcement whose strain, upon activation of the reinforcement in situ, induces stress into the matrix. As used herein and in the appended claims, the term "matrix" denotes any one or more components of the engineered composite outside of the self-stressing reinforcement, such as a polymer, a polymer resin, a cement, a polymer/resin containing one or more fillers and/or one or more aggregates and/or one or more types of non-self-stressing reinforcement, and a concrete containing one or more fillers and/or one or more aggregates and/or one or more types of non-self-stressing reinforcement, among others. Examples of cementitious materials include, but are not limited to, Portland cement and concrete, gypsum plaster and concrete, pozzolanic cement and concrete, fly ash cement and concrete, and mortar, among others. Examples of polymers include, but are not limited to, epoxies, elastomers, and hydrogels, among others. Fundamentally, there is no limitation on the composition of the matrix surrounding the self-stressing reinforcement.

As described in more detail below, an activator of the present invention is generally one of a "self-activator," an "internal activator," and an "external activator" or a combination of two or more of these types. A self-activator is an activator that bring about the inducing of stress into matrix 108 from self-stressing reinforcement 104, such as by causing the release of pre-strain within the self-stressing reinforcement or causing new strain within the self-stressing reinforcement, by virtue of the natural and usual condition of the matrix. Examples of a self-activator include, but are not limited to, a change in pH within a matrix (such as occurs as part of the curing reaction of Portland-cement concrete), a change in moisture content within a matrix (such as occurs in Portland-cement concrete), a change in internal temperature of a matrix (such as occurs as part of the exothermic curing reaction of Portland-cement concrete, two-part epoxies, and other matrix materials), and a change in solvent content of a matrix (such as can occur in a polymer-based matrix), among others. A self-activator is represented in FIG. 1 by element numeral 112, which simply points to engineered composite 100 itself, since a self-activator is not added to the engineered composite; rather, it is a natural and usual aspect of the engineered composite.

An internal activator, such as internal activator 116, is an activator that brings about the inducing of stress in matrix 108 from self-stressing reinforcement 104, such as by causing the release of pre-strain within the self-stressing reinforcement or causing new strain within the self-stressing reinforcement, by the addition of material to the matrix. Examples of an internal activator suitable for use as internal activator 116 include chemical additives in any suitable form, such as liquid, solid (e.g., powdered, granular, etc.), and suspension, among others. In some cases, internal activator 116 is added solely for the purpose of activating self-stressing reinforcement 104 contained in matrix 108 and is selected to minimize the impact on other properties of engineered composite 100, such as its strength, durability, workability. In other cases, internal activator 116 may provide one or more benefits to engineered composite 100 in addition to its activation ability, such as to improve its workability, increase strength, speed curing, etc.

An external activator, such as external activator 120, is an activator that brings about the inducing of stress in matrix 108 from self-stressing reinforcement 104, such as by causing the release of pre-strain within the self-stressing reinforcement or causing new strain within the self-stressing reinforcement, by the external application of energy to the matrix. Examples of an external activator suitable for use as external activator 120 include, but are not limited to, heat, ultraviolet light, infrared light, sound, ultrasound, mechanical vibration, and impact, among others.

Self-stressing reinforcement 104 may have any suitable size and configuration. Exemplary configurations for self-stressing reinforcement 104 include fibers (single and bundled), rods (single and bundled), fabrics (woven and nonwoven), meshes, and grids, among others. In each of these configurations, the fibers, rods, or constituent component, such as thread, wires, links, etc., may be smooth or textured and/or include one or more other features, such as nodules, ridges, bosses, teeth, etc., that promotes a mechanical interlock between the reinforcement and the other constituent(s) of engineered composite, such as matrix 108 or component(s) thereof (e.g., polymer, cement, or other binder, and/or aggregate, such as sand, gravel, crushed stone, slag, recycled concrete, and/or geosynthetic aggregate, among others). Self-stressing reinforcement 104 may also be provided in any suitable quantity, in any suitable orientation, and in any suitable locations within matrix 108. For example, self-stressing reinforcement 104 may be provided as an additive to matrix 108 during a mixing process so that the reinforcement is distributed in random orientations throughout the matrix. In such embodiments, the quantity might, for example, be determined by the service conditions of engineered composite 100. For example, in a concrete slab scenario, the amount of self-stressing reinforcement 104 added to the concrete matrix 108 might be greater if the slab is subjected to relatively large temperature changes and/or corrosive material(s) (e.g., road salt) over its service life than if the slab were subjected to only relatively small temperature changes and/or little to no corrosive material(s) over its service life. As another example of orientation and location, self-stressing reinforcement 104 may be a longitudinally acting reinforcement with its longitudinal axis oriented parallel to any tensile strength that develops within engineered composite 100, such as from thermal strain, applied load, and/or gravity load, among others. Depending on the configuration of self-stressing reinforcement 104, the reinforcement may be located at a particular location within engineered composite 100 where its effects are desired, such as near a face of the engineered composite, among other locations. Those skilled in the art will understand how to make the most effective use of self-stressing reinforcement 104.

As exemplified below, the one or more materials of self-stressing reinforcement 104 that is/are responsive to activator 112, 116, 120 to achieve the pre-stressing of engineered composite 100 may be deployed in a variety of ways, depending on the mode of operation of the self-stressing reinforcement and the material(s) at issue. Exemplary modes of operation of self-stressing reinforcement 104 include pre-tensioning of the reinforcement and in-situ contraction of the reinforcement. For the pre-tensioned mode of operation, a first portion of self-stressing reinforcement 104 is held in a pre-tensioned state by a second portion of the reinforcement. In this mode, the material(s) of self-stressing reinforcement 104 responsive to activator 112, 116, 120 is present in the second portion, and the activator causes the second portion to release the pre-tension in the first portion in engineered composite 100 so that this pre-tension induces compression into matrix 108 of the engineered composite surrounding the reinforcement. For example, activator 112, 116, 120 may cause the second portion of self-stressing reinforcement 104 to dissolve or otherwise lose its ability to carry the initial compressive load from the pre-stressing of the reinforcement. As for materials, polymers or metals (including shape memory alloys) may be used. A linear geometry is one possibility, but it may be advantageous (particularly with metals) to have folded, i.e., spring-loaded arrangements.

For the in-situ contraction mode of operation, some or all of self-stressing reinforcement 104 may be composed of one or more materials that contract when exposed to activator 112, 116, 120. Then, when self-stressing reinforcement 104 is present in engineered composite 100 and exposed to activator 112, 116, 120, the contraction of the reinforcement induces compression into matrix 108 of the engineered composite immediately adjacent to the contracting portion(s) of the reinforcement. In some embodiments, the selected or contrived material(s) may experience more contraction in one direction, for example, along the longitudinal axis of a fiber, than in other directions. It is noted that some embodiments of self-stressing reinforcement made in accordance with aspects of the present invention may incorporate materials that allow the reinforcement to function in both modes of operation. Self-stressing reinforcement actuated by either molecular reconfiguration or pre-stress could move in a variety of configurations if different materials are placed in the cross sections at specific locations. In this manner, shortening, spiraling, and/or curling could be utilized.

In either mode of operation, activator 112, 116, 120 can be any suitable condition or material that is innate to engineered composite 100 and/or precursor thereto, added to the engineered composite, or applied to the engineered composite. Examples of activators include, but are not limited to, mixing and/or emulsifying agents, such as water for Portland cement and kerosene, soap, wax, etc., for asphalt, conventional admixtures, such as air entrainers, water reducers, retarders, and accelerators, specialized additives added solely to function as the activator, pH, heat, sound energy, electromagnetic energy, and environmental stimuli, such as post-cure cracking and exposure to air and/or water, among others. Fundamentally, there is no limitation on the type of activator other than it activates the one or more materials of the reinforcement as described above. It is noted that the term "activator" (singular) is used herein for convenience. However, "activator" is to be construed herein and in the appended claims as also covering multi-component activators for activating a single type of material and multiple distinct activators for activating multiple differing materials.

It is noted that the timing of the change within each activated material of self-stressing reinforcement 104 can, in some embodiments, be an important consideration. For example, the change cannot occur too quickly in some types of engineered composites, because the change would occur before one or more of the other constituents of engineered composite 100 may not be ready to receive a transfer of stress from self-stressing reinforcement 104. To illustrate, when Portland-cement concrete is initially mixed, it is relatively fluid, and the cement effectively cannot handle the shear stresses that would be needed to pre-compress a Portland-cement-concrete-based version of engineered composite 100 as described above. Consequently, if activation occurred completely while the cement is still in this weak state, the desired pre-compressing would not occur. In this case, one or more measures would need to be taken to avoid too early of a complete activation relative to engineered composite 100 reaching a level of cure where it can handle such shear stresses. The measure(s) taken to delay, prolong, and/or otherwise control the timing of the activation and/or change in the corresponding material depend(s) on the types of material and activator involved. Examples of ways of controlling activation of each material in self-stressing reinforcement 104 by a corresponding activator 112, 116, 120 include, but are not limited to, using a timed-released activator additive, using a activator-timing-control additive in addition to the activator, adjusting the chemistry of the activated material, providing the reinforcement with one or more activation delay layers, and applying the activator at a specific time during curing, among others.

Benefits of self-stressing reinforcement 104 include the relative ease and simplicity of creating higher-performance pre-stressed engineered composites using reinforcement that is generally self-activated, albeit in some cases with the addition of a specialized activator. For embodiments of self-stressing reinforcement 104 involving fibers and/or other configurations that are added in the same manner as conventional fibers, another benefit is the possibility of creating a new class of high-performance engineered composites that combine advantages of pre-stressed or post-tensioned reinforcement with random orientations of the reinforcement. For example, utilizing such pre-stressing self-stressing reinforcement 104 can provide concrete having fewer micro-cracks, which is particularly beneficial for harsh environments, such as parking structures in cold-weather regions that use road salts and other chemicals that often greatly accelerate the deterioration of such structures via corrosion of the reinforcing steel and other chemical reactions with the concrete. Other benefits will surely be realized over time as the technology becomes more pervasive.

Self-stressing reinforcement 104 can be deployed into use in any of a variety of ways. For example, and for fibers, the fibers can be pre-dispersed in a composite mix and form into a random pattern after placement and curing. Alternatively, the fibers can be added at the time of mixing, perhaps to improve shelf life. As another example relative to fibers, the fibers can be spun into yarns, and these yarns can be formed into ropes, meshes, and fabrics for placement into the concrete at predetermined locations. As yet a further example for fibers, certain structural members use formwork as part of the final member. It may be possible to create "hairy" formwork that binds tightly to the concrete for enhanced performance. Other configurations of self-stressing reinforcement of the present invention can be deployed into use in other manners, such as manners that mimic deployment of conventional reinforcement.

It is noted that engineered composite 100 may include other features, such as a laminated structure. For example, dashed line 124 is shown to depict an optional interface between two layers of engineered composite 100, with self-stressing reinforcement 104 illustrated as being present in both the upper and lower portions (layers) 100A and 100B, in some embodiments also spanning across the interface. As another example, dashed box 128 is shown to depict an optional layer of a resulting laminate that does not include self-stressing reinforcement. It is noted that any laminate formed by engineered composite 100 need not be limited to the number of layers shown in FIG. 1, as those layers are merely illustrative. As another example, engineered composite 100 may also include conventional reinforcement 132, which may or may not be present in two or more layers of a laminate version of the engineered composite. Such conventional reinforcement 132 may be of any suitable type known in the art. It is further noted that engineered composite 100 may be engaged with another structure 136. In one example, engineered composite 100 is engaged with a structural member (structure 136) (e.g., a joist, beam, or girder) for the purpose of reinforcing the structural member and/or inhibiting cracking, among other things.

FIGS. 2A-2C illustrate an exemplary coaxial self-stressing reinforcement 200 that includes, when first added to a matrix (see FIG. 2A), such as matrix 108 of FIG. 1 as self-stressing reinforcement 104, an initially pre-tensioned core 204 contained within an initially pre-compressed sleeve 208, with the pre-tension depicted by arrows 212 in FIGS. 2A and 2B and the pre-compression depicted by arrows 216 in FIG. 2A. The interaction between core 204 and sleeve 208 keep them in their respective pre-tensioned and pre-compressed states. Coaxial self-stressing reinforcement 200 may be made in any suitable manner, such as by tensioning core 204, applying an un-compressed sleeve 208 that bonds with the core, and then releasing the core after the bond has formed so that some of the tension in the core transfers to compression within the sleeve. As another example, an un-tensioned sleeve 208 may be bonded to an un-tensioned core 204, and then the sleeve may be caused to elongate so as to stretch the core, thereby pre-tensioning it. In an alternative embodiment of using an initially un-stressed core 204 and sleeve 208, the un-tensioned core may be caused to partially contract, thereby inducing tension into the core and compression into the sleeve. As an example of the latter, this may occur when the materials of core 204 and sleeve 208 have differing coefficients of thermal expansion. If, for example, the core and sleeve are coextruded at one or more certain elevated temperatures (such as one or more polymer melting temperatures) and then cooled, the cooling will cause the desired internal stresses. FIG. 2B illustrates the state of core 204 after sleeve 208 (FIG. 2A) has been dissolved or otherwise rendered unable to carry any compressive load on its own. It is noted that the state of core 204 depicted in FIG. 2B may not actually exist, as the typical mechanism when the core is in a matrix is for the core to slowly transfer stress into the matrix. FIG. 2C depicts core 204 after releasing all of its internal pre-tensioning. As can be seen in FIG. 2C, core 204 has shortened as a result of the release of the pre-tensioning strain. The state of core 204 depicted in FIG. 2C is also largely fictitious in that when in-situ within a matrix after stress transfer to the matrix, a portion of tensile stress will remain in the core. In FIGS. 2A to 2C, the transverse cross-sectional shape of core 204 may be any desired, such as circular, oval, rectangular/square, etc., with the cross-sectional shape of sleeve 208 shaped accordingly, at least on its inner surface(s) that engage the core. The cross-sectional shape and/or cross-sectional size of core 204 may also vary along the length of coaxial self-stressing reinforcement 200 as desired, such as to form nodules and/or other structures that aid in providing mechanical interlock with a matrix in which the reinforcement is embedded.

Coaxial self-stressing reinforcement 200 may be of any suitable size, ranging from small diameter fiber size to sizes comparable to conventional reinforcing wire and bars for conventional Portland-cement-concrete-based structures. An example of coaxial self-stressing reinforcement 200 is described below in connection with the pH-responsive self-stressing reinforcement example. During activation by a suitable activator, such as any of activators 112, 116, and 120 of FIG. 1, sleeve 208 is dissolved or otherwise caused to release its pre-compression so as to transfer the pre-tension in core 204 to the surrounding matrix (not shown).

One example of coaxial self-stressing reinforcement 200 is a coaxial microfiber structure in which core 204 comprising a polypropylene (PP) encapsulated by sleeve 208 of polyethylene oxide (PEO). These coaxial fibers are processed at a high temperature (above the melting temperatures of both materials), for example, using a coaxial electrospinning setup. FIG. 3 is a scanning electron micrograph of an example of such coaxial microfiber structure. Upon cooling down to room temperature as the fibers leave the nozzle tip, the PP (i.e., core 204) will experience more specific volume change than the PEO phase (i.e., sleeve 208). For example, the specific volume change of the PP phase is estimated at ~0.2197 cm$^3$/g from 200° C. to 30° C. versus that of PEO is estimated at ~0.17 cm$^3$/g over the same temperature change. This will cause PP in core 204 to go into tension (i.e., the PP phase of sleeve 208 shrinks more than the PEO phase over the same temperature change). When the water-soluble PEO phase of sleeve 208 is dissolved by water over time, the PP phase of core 204 will shrink back to pre-tension geometry. However, when this shrinking occurs in a matrix (not shown, but see the discussion immediately below) and the dissolution parameters are selected and controlled correctly, the shrinkage causes a transfer of the tension within core 204 to the matrix, as described above. This particular example can have over 30% geometry change over the process described above.

Figure 4A:
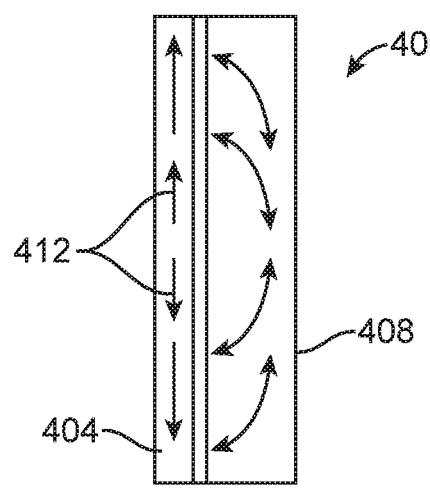
FIGS. 4A to 4C are cross-sectional views, to scale relative to one another, of a segment of asymmetrically pre-tensioned reinforcement of the present invention, respectively, before tension release, before deformation from the release of the internal tension, and after tension release.
Figure 4B:
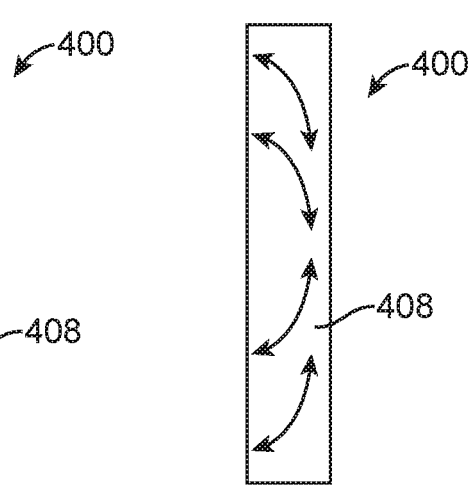
Figure 4C:
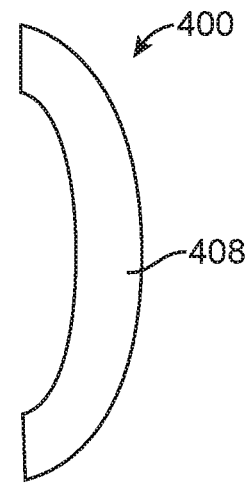

Whereas FIGS. 2A to 2C illustrate an example of multi-component self-stressing reinforcement 200 in which the pre-stressed components, i.e., core 204 and sleeve 208, are coaxial with one another so as to generally induce uniform stress across the cross-sectional area of the core, FIGS. 4A to 4C illustrate an exemplary multi-component self-stressing reinforcement 400 in which the pre-compressed component 404 and the pre-tensioned component 408 are initially located and affixed to one another to cause a non-uniform longitudinal tensile stress in the pre-tensioned component. In the example shown in FIG. 4A, pre-compressed component 404 is initially in compression (as illustrated by arrows 412), which effectively holds the left-hand side (relative to FIG. 4A) of pre-tensioned component 408 in tension. When pre-compressed component 404 is removed, for example, by dissolution or other means or otherwise allowed to relax its stress, the pre-tension of the left-hand side of pre-tensioned component 408 also tends to relax, thereby causing the pre-tensioned component to curl, as seen in FIG. 4C. However, when pre-tensioned component 408 is embedded in a suitable matrix (not shown), this curl is counteracted by the matrix, thereby transferring at least a portion of the tensile strain within the pre-tensioned component into compression within the matrix. In other embodiments, the stress roles of components 404 and 408 can be reversed, with component 404 being pre-tensioned and component 408 being pre-compressed. In this case, when component 404 is removed or otherwise relieved of its pre-tension, component 408 would curl in the direction opposite of the direction shown in FIG. 4C.

It is noted that multi-component self-stressing reinforcement 400 of FIGS. 4A to 4C is a simple example. Those skilled in the art will readily appreciate that more complex multi-component self-stressing reinforcement can be made using the fundamental principles of operation of this basic example. For example, multiple pre-compressed components can be used with one or more pre-tensioned components, and vice versa, to create self-stressing reinforcement having virtually any desired shape. For example and on a particular piece of self-stressing reinforcement, a plurality of releasing components may be spaced apart along the length of an active component, for example on the same or differing sides of the released component. As used herein and in the appended claims, the term "releasing component" refers to a component of multi-part self-stressing reinforcement that is dissolved or otherwise removed or relieved of its stress by an activator so as to release the stress within an "active component," which is a component that remains active within an engineered composite as structure that induces stress into the matrix of the composite.

While the immediately foregoing examples are directed to multi-component self-stressing reinforcement, self-stressing reinforcement of the present invention may be composed of a single component. Following is an example based on Portland-cement concrete.

Structural concrete uses cement to bind stone and sand aggregates together. Ideally the stones and sand interlock so that loads transfer through the stones and sand, while the cement merely holds the composite together, preferably with an overall tension. Portland cement is the most common of the cements. It is a multi-component mixture composed of calcium oxide (lime) combined with silicates ($SiO_2$) and other additives. When mixed with water, Portland cement forms an alkali liquid with a pH ranging from 10 to 13 and initiates a complicated curing reaction. The curing is exothermic and causes the liquid to gel and then solidify. Typical cure times are 7 days to attain 75% of strength and 28 days to attain full strength.

This exemplary embodiment utilizes one or more pH-responsive materials for manufacturing self-stressing reinforcement for structural applications. Concrete structures experience the increase in pH value during curing of the concrete, and this embodiment leverages one or more materials that contract as pH increases. For example, in some Portland-cement concretes, pH can change from 7 to 10 over two weeks of curing. In the context of microfibers and other elongated reinforcement, this contraction can result in lengthwise shortening of the self-stressing reinforcement. When the shortening of the self-stressing reinforcement is properly timed relative to curing, it can allow effective post-tensioning of the concrete, thereby improving resilience to severe loading. One example of a pH-responsive material is a polybase polymer (e.g., chitosan-derived biopolymer, collagen, etc.), which shrinks the geometry of the self-stressing reinforcement as pH increases. When the self-stressing reinforcement is configured as microfibers, the fibers can be created, for example, by a melt electrospinning process, among other processes, such as other fiber-forming processes known in the art. Electrospinning is a manufacturing technique that can produce both nano- and microfiber structures by using electrical charge. First, high viscosity gel-like chitosan solution is prepared and placed into a chamber. Then, for example, micro-sized fibers with target size ranges of 10 to 20 μm in diameter and 5 to 10 cm in length will be produced using the setup shown. The pH-responsive material can be chemically modified to control and fine-tune its response behaviors with respect to the pH level.

FIGS. 5 to 9 illustrate some exemplary shapes and shape changes for fiber-type self-stressing reinforcement made in accordance with the present invention. Those skilled in the art will readily appreciate that the shapes and shape changes illustrated in FIGS. 5 to 9 are merely illustrative and that many other shapes and many other shape changes can be made and achieved by suitably designing the self-stressing reinforcement. Thus, these examples should not be considered to be an exhaustive set of examples.

Figure 5:
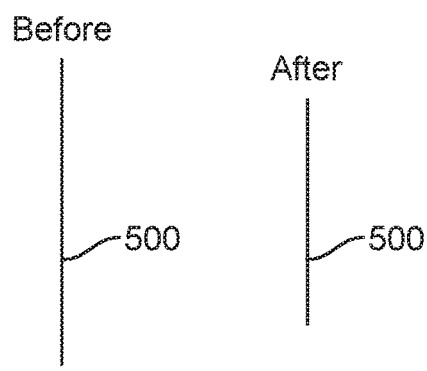
FIG. 5 is a diagram illustrating, with consistent internal scale, before and after sizes of a straight fiber that contracts during curing in response to an activator.

FIG. 5 shows before and after sizes of a straight self-stressing reinforcing fiber 500 that contracts in response to an activator (not shown). Straight fiber 500 may be a multi-component type fiber with releasing and active portions, or, alternatively, a single component active fiber.

Figure 6:
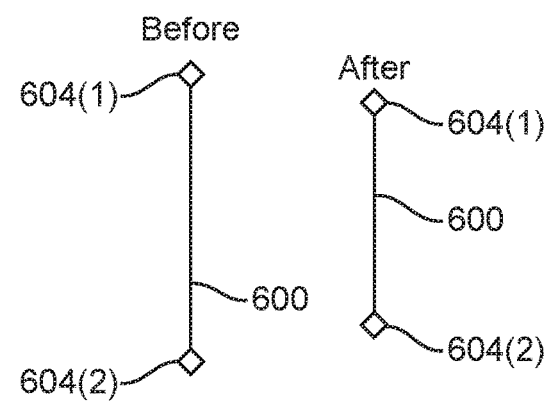
FIG. 6 is a diagram illustrating, with consistent internal scale, before and after sizes of a straight fiber having end features, wherein the fiber contracts during curing in response to an activator and the end features provide mechanical interlock with a cured material.

FIG. 6 shows before and after sizes of a straight self-stressing reinforcing fiber 600 having end features 604(1) and 604(2), wherein the fiber contracts during curing in response to an activator (not shown), and the end features provide mechanical interlock with the matrix (not shown) in which the fiber is embedded. End features 604(1) and 604(2) may be of any suitable size and shape, including spherical or other curved three-dimensional shape, cubic or other multi-faceted shape, etc. End features 604(1) and 604(2) may be made of the same material as straight fiber 600, or they may be made of a different material. Straight fiber 600 may be a multi-component type fiber with releasing and active portions, or, alternatively, a single component active fiber.

Figure 7:
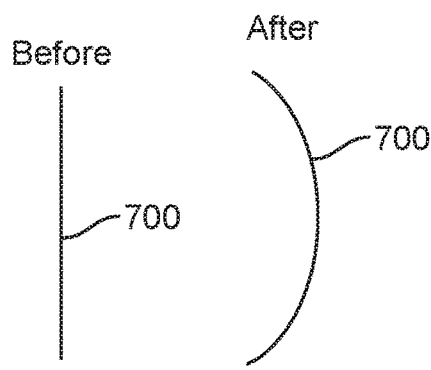
FIG. 7 is a diagram illustrating, with consistent internal scale, before and after configurations of a fiber that curls during curing in response to an activator, thereby tending to compress the cured material.

FIG. 7 shows before and after configurations of a self-stressing reinforcing fiber 700 that curls during curing in response to an activator (not shown), thereby tending to compress the matrix (not shown) in which the fiber is embedded.

Figure 8:
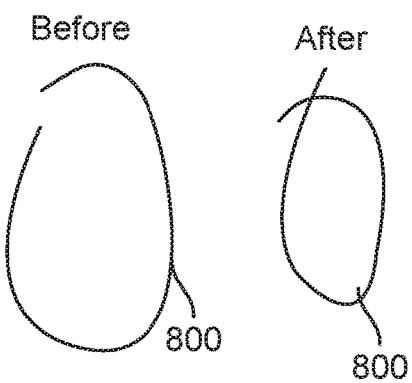
FIG. 8 is a diagram illustrating, with consistent internal scale, before and after configurations of a fiber having a spiral or circular shape that has a radius that reduces during curing in response to an activator, thereby tending to compress the cured material.

FIG. 8 shows before and after configurations of a self-stressing reinforcing fiber 800 having a spiral or circular shape that has a radius that reduces during curing in response to an activator (not shown), thereby tending to compress the matrix (not shown) in which the fiber is embedded.

Figure 9:
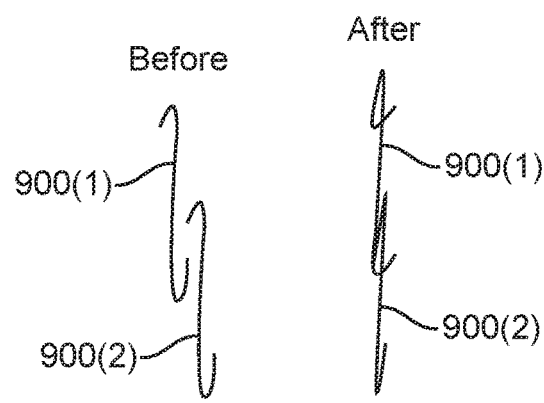
FIG. 9 is a diagram illustrating before and after configurations of a pair of fibers that curl during curing in response to an activator so that, when randomly oriented, they tend to intertwine and form a network of interconnecting fibers that compress the cured material.

FIG. 9 shows before and after configurations of a pair of self-stressing reinforcing fibers 900(1) and 900(2) that curl during curing in response to an activator (not shown) so that, when randomly oriented, tend to engage one another as they curl and potentially create fiber network structures with longer range interactions that compress the matrix (not shown) in which the fibers are embedded.

Several of the detailed examples above are directed specifically to Portland-cement concrete, but as noted above, aspects of the present invention have applicability to other engineered composites. Following are several examples of utilizing self-stressing reinforcement in fiber-reinforced plastic (FRP) in various applications. In the context of FRP in general, self-stressing reinforcement of the present disclosure can be activated by any of the activators discussed above, namely, self-activators, internal activators, and external activators, depending on a particular design. A self-activator for FRP applications may be any one or more chemical solvents and/or chemical processes and/or related conditions (e.g., heat) that occur in curing FRPs. An internal activator for FRP applications may include an additive added specifically to at least activate the self-stressing reinforcement. An external activator for FRP applications may include, for example, application of external energy, such as in the form of microwaves, ultraviolet light, or penetrating infrared light, among others. In one example, self-stressing reinforcement of the present disclosure may be used in FRP layup of FRP structures in place of conventional FRP reinforcement or in combination with conventional FRP reinforcement, as needed or desired to suit a particular application. In such applications, the layup process can be the same as a conventional layup process, except for the addition or substitution of the self-stressing reinforcement and, as needed, the addition of an internal activator or the application of an external activator, or combination thereof if an external activator works in combination with an internal activator to activate the self-stressing reinforcement. Other exemplary applications of FRP-based engineered composites are described next in conjunction with FIGS. 10 to 12.

Figure 10:
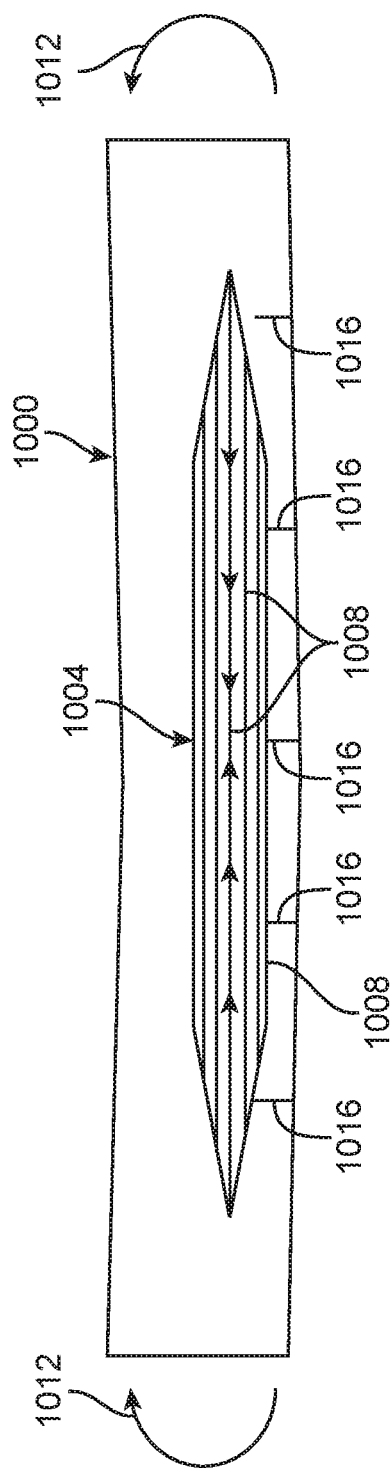
FIG. 10 is a side elevational view of a structural beam reinforced with an external self-stressing-fiber-reinforced patch made in accordance with aspects of the present disclosure.

Referring now to FIG. 10, this figure illustrates a structural beam 1000 reinforced with an FRP patch 1004 (a similar one may be located on the opposite side of the beam not visible in FIG. 10) that contains self-stressing reinforcement 1008 of the present disclosure. In this example, beam 1000 is made of conventionally reinforced Portland-cement concrete, which is well-known to be weak in tension. The loading is represented by arrows 1012 that illustrate beam 1000 works in bending so as to cause cracks 1016 on the bottom of the beam due to tensile stress induced in the beam by bending. FRP patch 1004 was added while beam 1000 is loaded and after cracks 1016 formed as a remedial measure to at least partially rejuvenate the beam. Patching Portland-cement concrete structure members using conventional patches similar to FRP patch 1004, but without self-stressing reinforcement 1008, is a conventional practice. However, conventional patches are sub-optimal because the structural members often cannot be unloaded and the patches are bonded to the structural members with an adhesive that needs to cure before the patches can take any stress. Thus, conventional patches work only when the structural members are loaded beyond the loads the structural members were carrying when the patches were applied. FRP patch 1004, on the other hand, is pre-stressed during curing of the matrix component of the FRP patch or after such curing, depending on the type of activator used. This in-situ pre-stressing allows FRP patch 1004 to take part of the existing load on beam 1000, thereby relieve stress and strain within the beam itself. As with the new-component layup embodiment described above, activation of self-stressing reinforcement 1008 can be effective by any of the three types of activators described above, or any suitable combination thereof.

Figure 11A:
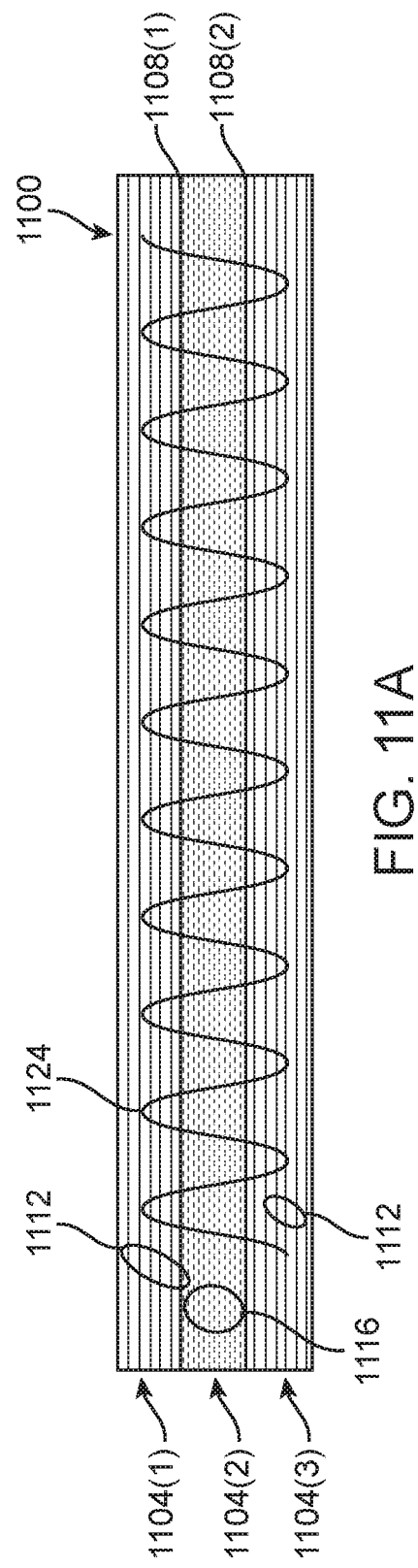
FIG. 11A is a longitudinal cross-sectional view of a polymer laminate containing interlaminate self-stressing reinforcement that activates in response to curing of the polymer.
Figure 11B:
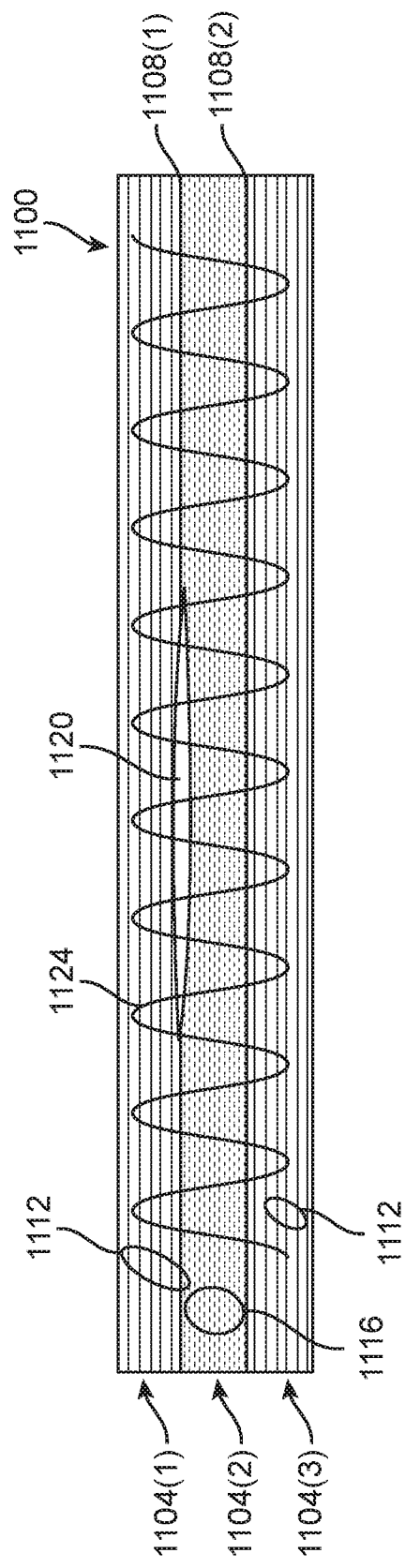
FIG. 11B is a longitudinal cross-sectional view of the laminate of FIG. 11A, showing a delamination between two of the layers.

FIGS. 11A and 11B illustrate an FRP laminate 1100 composed of a number of layers, in this example three layers 1104(1) to 1104(3), which may be of the same composition or differing compositions, that form two interfaces 1108(1) and 1108(2) between adjacent ones of the layers. In this example, layers 1104(1) and 1104(3) have reinforcement 1112, which may be conventional or self-stressing, running in a first direction, and layer 1104(2) has reinforcement 1116, which also may be conventional or self-stressing running in a second direction different from the first direction, here, 90° to the first direction. As is known in the art, FRP laminates, such as laminate 1100, can develop one or more regions of delamination at the interfaces between adjacent layers, such as delaminated region 1120 of FIG. 11B at interface 1108(1), for any of a variety of reasons. To combat such delaminated regions, FRP laminate 1100 of FIGS. 11A and 11B includes anti-delamination self-stressing reinforcement 1124 that crosses one or both interfaces 1108(1) and 1108(2) where delamination occurs. In this example, anti-delamination self-stressing reinforcement 1124 is activated during its manufacture so that any region of weakness within either of interfaces 1108(1) and 1108(2) is inhibited from becoming a full-fledged delamination that jeopardizes the structural integrity of FRP laminate 1100. As with the new-component layup embodiment described above, activation of self-stressing reinforcement 1008 can be effective by any of the three types of activators described above, or any suitable combination thereof. It is noted that while exemplary anti-delamination self-stressing reinforcement 1124 is shown as a fiber yarn interwoven among reinforcement 1112 and 1116, it need not be continuous, nor does it need to be woven. Generally, the primary requirement is that the anti-delamination self-stressing reinforcement 1124 crosses at least one of interfaces 1108(1) and 1108(2) where delamination might occur.

Figure 12:
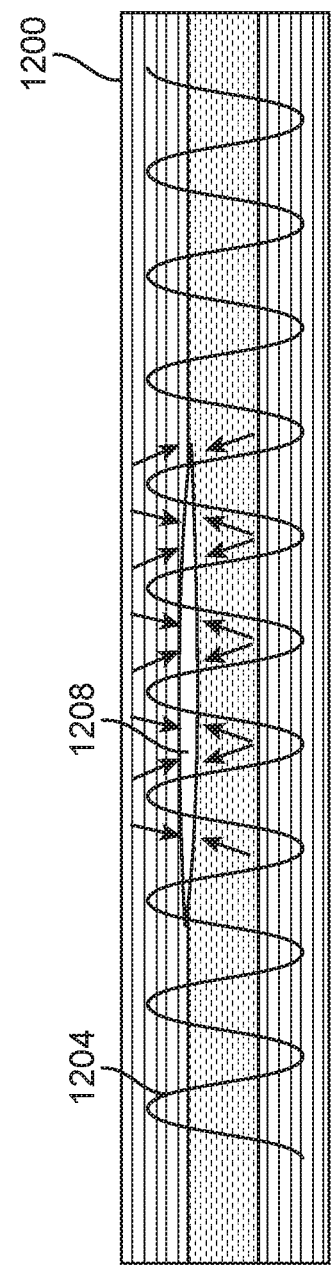
FIG. 12 is a longitudinal cross-sectional view of a laminate containing interlaminate self-stressing reinforcement that activates in response to formation of an internal delamination.

FIG. 12 illustrates a self-healing FRP laminate 1200 that is the same as FRP laminate 1100 of FIGS. 11A and 11B, except that self-stressing reinforcement 1204 is not activated during manufacture of the laminate. Rather, self-stressing reinforcement 1204 is activated only after a delaminated region, here delaminated region 1208, has developed. In some embodiments, self-stressing reinforcement 1204 is self-activated, e.g., activated by the presence of a solvent from FRP laminate 1200 collecting in delaminated region 1208. In other embodiments, self-stressing reinforcement 1204 is internally activated, e.g., activated by the presence of one or more additives added to FRP laminate 1200 during manufacture for the purpose of activating the self-stressing reinforcement or resulting from one or more additives added to the FRP laminate for the purpose of activating the self-stressing reinforcement. In yet other embodiments, self-stressing reinforcement 1204 is externally activated by an external activator, such as applied energy (see examples elsewhere herein), one or more external substances applied to trigger activation, or one or more external substances present within delaminated region 1208 as a consequence of the formation of the delamination region, such as water from an external source, among others. Other components and features of FRP laminate 1200 of FIG. 12 not described are the same as or similar to the corresponding components and features of FRP laminate 1100 of FIGS. 11A and 11B. It is noted that the same principles of self-healing described in conjunction with FIG. 12 can be applied to internal and/or external cracking.

Figure 13:
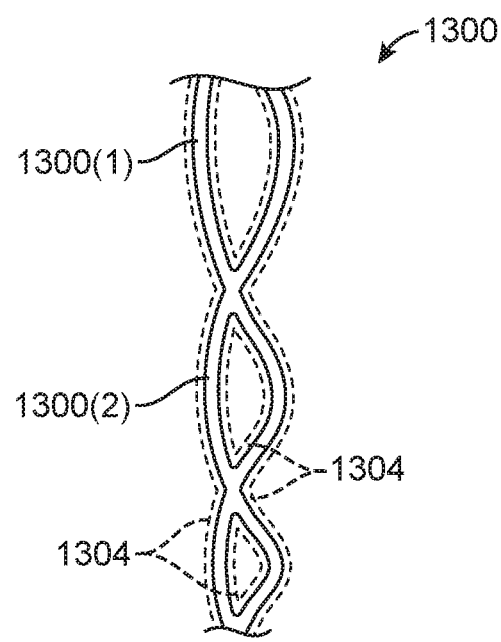
FIG. 13 is a diagram illustrating a portion of exemplary self-stressing reinforcement configured in a double helix arrangement.

FIG. 13 illustrates exemplary self-stressing reinforcement 1300 configured as a double helix. Self-stressing reinforcement can be embodied in any of a variety of ways, depending, for example, on the application and the desired mode of activation and operation. For example, in some embodiments, self-stressing reinforcement 1300 may be composed of a pair of strands 1300(1) and 1300(2) both of a contracting type that contract longitudinally in response to an activator (not illustrated). As strands 1300(1) and 1300(2) attempt to contract, their helical shape acts against the matrix (not shown) in which self-stressing reinforcement 1300 is encased so as to induce stress into the surrounding matrix.

As another example, self-stressing reinforcement 1300 may be of a pre-stressed type in which strands 1300(1) and 1300(2) are secured (e.g., bonded) together intermittently or continuously and pre-stressed with opposing stresses, one in tension and the other in compression (holding the other in tension). In this example, upon activation, strand 1300(1) or 1300(2) in compression may relax its stress (e.g., by dissolving or other mechanism) thereby relaxing the tension in the other strand, which then gets at least partially transferred into the surrounding matrix (not shown). Other variants are also possible, such as pre-stressing each strand 1300(1) and 1300(2) individually with regions of compression and tension so that upon relaxation of one or the other of the pre-stresses each strand attempts to achieve a desired shape and thereby imparts compressive stress into the surrounding matrix as the matrix resists the shape change.

As a further example, self-stressing reinforcement 1300 may be of a pre-stressed type in which strands 1300(1) and 1300(2) are encased in an optional pre-compressed covering 1304 that holds the internal strands in tension until the self-stressing reinforcement is deployed within a suitable matrix (not shown) and activated by a suitable activator. As with exemplary coaxial self-stressing reinforcement 200 of FIGS. 2A-2C, in response to activation, pre-compressed covering 1304 of FIG. 13 releases tension within strands 1300(1) and 1300(2) and, when self-stressing reinforcement 1300 is embedded in a suitable matrix (not shown), this release of tension imparts compression into surrounding portions of the matrix. In some embodiments, strands 1300(1) and 1300(2) may be made of the same materials as described above in connection with self-stressing reinforcement 200 of FIGS. 2A-2C and release pre-tension within the strands in the same or similar manner as with reinforcement 200.

Figures 14A, 14B:
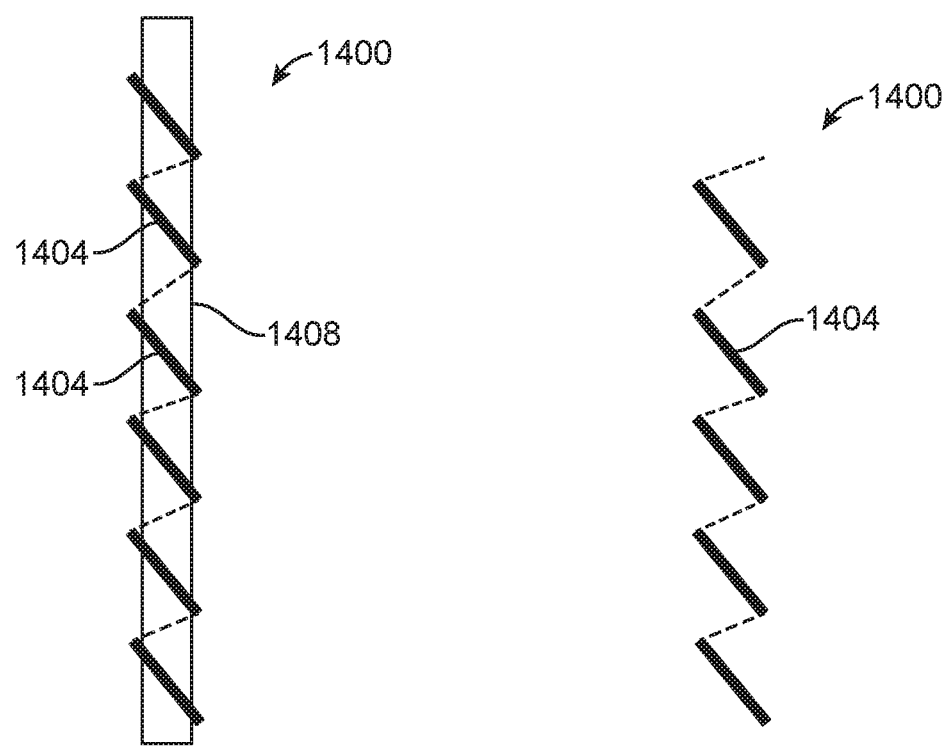
FIG. 14A is a diagram illustrating an exemplary self-stressing reinforcement configured in a single helix arrangement with a dissolving pre-stressing core.
FIG. 14B is a diagram illustrating, with a scale consistent with the scale of FIG. 14A, the self-stressing reinforcement of FIG. 14A after the pre-stressing core has dissolved.

FIG. 14A shows another example of self-stressing reinforcement 1400 of a pre-stressed type. In this example, self-stressing reinforcement includes a helical strand 1404 disposed around a core 1408 and affixed to the core. Helical strand 1404 is held in its shape shown by core 1408, which is in compression as it holds the helical strand in tension. In some embodiments, core 1408 may be of a dissolving type (such as any of the dissolving types described above) such that as the core dissolves, helical strand 1404 attempts to achieve its relaxed state (as seen in FIG. 14B). When in situ within a matrix (not shown) that resists the shape change of helical strand 1404, the affinity of helical strand 1404 to achieve its relaxed state induces compressive stress into the surrounding matrix. The materials of helical strand 1404 and core 1408 may be any suitable materials that provide the necessary/desired functionality, including materials described herein. Core 1408 may have any suitable transverse cross-sectional shape, such as circular, polygonal, oval, etc., and the shape of the core along its length may also be any suitable shape, such as an open shape (straight (shown), curved, zig-zag, etc.) or a closed shape (e.g., toroidal, etc.).

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. Self-stressing reinforcement for an engineered composite comprising a matrix having a cure time for achieving a cured state from an uncured state, the self-stressing reinforcement comprising:
   a body designed and configured so that, when said body is present in the matrix, stress transfers between portions of the body and the matrix in the cured state, the body composed of at least one material chemically responsive to an activator present within the matrix so as to cause a change in the body that results in tensile stress in the body inducing compressive stress into the matrix so as to cause the matrix to be pre-stressed in the cured state, wherein the activator is selected from a group consisting of:
      a self-activator present in the matrix but not as an additive; and
      an internal activator internal to the matrix and added to the matrix as an additive;
   wherein the body comprises a releasing component and an active component, wherein, when the self-stressing reinforcement is present in the matrix and exposed to the activator:
      the releasing component is chemically activated by the activator to release pre-stress in the active component so as to transfer a portion of the pre-stress into the adjacent portions of the matrix to create the compressive stress in the adjacent portions of the matrix; and
      the active component comprises a core and the releasing component comprises a sleeve surrounding the core and holding the core in tension prior to activation, wherein the sleeve comprises the at least one material that responds chemically to the activator.

2. Self-stressing reinforcement according to claim 1, wherein at least one of the at least one material and the activator are designed and configured to control the change as a function of the cure time.

3. A pre-stressed engineered composite comprising each of the matrix and the self-stressing reinforcement of claim 1.

4. A method of making a pre-stressed engineered composite comprising adding the self-stressing reinforcement of claim 1 to the matrix.

5. The method according to claim 4, further comprising adding the activator to the matrix.

6. A method of rejuvenating a structural component, the method comprising:
   applying a patch to the structural component, the patch comprising a matrix and self-stressing reinforcement; and
   causing the self-stressing reinforcement to chemically activate so as to impart tensile strain within the patch so as to cause the patch to impart at least part of the tensile strain into the structural component as compressive strain.

7. The method according to claim 6, wherein the matrix of the patch comprises a polymer.

8. The method according to claim 6, wherein the activating of the self-stressing reinforcement occurs in response to curing of the matrix of the patch.

9. The method according to claim 6, wherein the activating of the self-stressing reinforcement includes adding an internal activator to the matrix of the patch.

10. The method according to claim 6, wherein the activating of the self-stressing reinforcement includes applying an external activator to the patch.

11. An engineered composite, comprising:
   a matrix;
   self-stressing reinforcement contained in the matrix, wherein the self-stressing reinforcement is designed, configured, and comprised of a material composed to respond chemically to an activator so as to cause the self-stressing reinforcement to undergo a change in internal stress within the self-stressing reinforcement and thereby impart compressive stress into adjacent portions of the matrix in physical contact with the self-stressing reinforcement; and
   the activator, wherein the activator is selected in conjunction with the material of the self-stressing reinforcement to activate the self-stressing reinforcement and is selected from the group consisting of:
      a self-activator present within the matrix but not as an additive; and
      an internal activator within the matrix and added to the matrix as an additive;
   wherein:
      the self-stressing reinforcement comprises, within the matrix, a releasing component and an active component;
      the releasing component is chemically activated by the activator to release pre-stress in the active component so as to transfer a portion of the pre-stress into the adjacent portions of the matrix to create the compressive stress in the adjacent portions of the matrix; and
      the active component comprises a core and the releasing component comprises a sleeve surrounding the core and holding the core in tension prior to activation, wherein the sleeve comprises the at least one material that responds chemically to the activator.

12. The engineered composite according to claim 11, wherein the matrix comprises a cementitious material.

13. The engineered composite according to claim 11, wherein the matrix comprises a polymer.

14. The engineered composite according to claim 11, wherein the material comprises a poly-base polymer responsive to the activator.

15. The engineered composite according to claim 14, wherein the poly-base polymer comprises a pH-responsive material selected from the group consisting of chitosan-derived biopolymers and collagens.

16. The engineered composite according to claim 11, wherein the self-stressing reinforcement comprises a plurality of fibers distributed randomly within the matrix.

17. An engineered composite, comprising:
   a matrix;
   self-stressing reinforcement contained in the matrix, wherein the self-stressing reinforcement is designed, configured, and comprised of a material composed to respond chemically to an activator so as to cause the self-stressing reinforcement to undergo a change in internal stress within the self-stressing reinforcement and thereby impart compressive stress into adjacent portions of the matrix in physical contact with the self-stressing reinforcement; and
   the activator, wherein the activator is selected in conjunction with the material of the self-stressing reinforcement to activate the self-stressing reinforcement and is selected from the group consisting of:
      a self-activator present within the matrix but not as an additive; and
      an internal activator within the matrix and added to the matrix as an additive;

wherein:
the material comprises a poly-base polymer responsive to the activator; and
the poly-base polymer comprises a pH-responsive material selected from the group consisting of chitosan-derived biopolymers and collagens.

18. The engineered composite according to claim 17, wherein the self-stressing reinforcement comprises, within the matrix, a releasing component and an active component, wherein the releasing component is chemically activated by the activator to release pre-stress in the active component so as to transfer a portion of the pre-stress into the adjacent portions of the matrix to create the compressive stress in the adjacent portions of the matrix.

19. The engineered composite according to claim 18, wherein the active component comprises a core and the releasing component comprises a sleeve surrounding the core and holding the core in tension prior to activation, wherein the sleeve comprises the material that responds chemically to the activator.

20. An engineered composite, comprising:
a matrix;
self-stressing reinforcement contained in the matrix, wherein the self-stressing reinforcement is designed, configured, and comprised of a material composed to respond chemically to an activator so as to cause the self-stressing reinforcement to undergo a change in internal stress within the self-stressing reinforcement and thereby impart compressive stress into adjacent portions of the matrix in physical contact with the self-stressing reinforcement; and
the activator, wherein the activator is selected in conjunction with the material of the self-stressing reinforcement to activate the self-stressing reinforcement and is selected from the group consisting of:
a self-activator present within the matrix but not as an additive; and
an internal activator within the matrix and added to the matrix as an additive;
further comprising first and second layers of matrix material forming an interface with one another, wherein the self-stressing reinforcement extends across the interface so as to inhibit delamination between the first and second layers at the interface.

21. The engineered composite according to claim 20, wherein the self-stressing reinforcement comprises a fiber woven among the first and second layers of the matrix.

* * * * *